United States Patent
Wang et al.

(10) Patent No.: US 11,443,042 B2
(45) Date of Patent: Sep. 13, 2022

(54) BLOCKCHAIN-BASED SOFTWARE VERSION DATA MANAGEMENT SYSTEM AND ESTABLISHING METHOD THEREOF

(71) Applicant: TIANJIN UNIVERSITY OF TECHNOLOGY, Tianjin (CN)

(72) Inventors: Jinsong Wang, Tianjin (CN); Hongwei Zhang, Tianjin (CN); Zening Zhao, Tianjin (CN); Sheng Lin, Tianjin (CN)

(73) Assignee: TIANJIN UNIVERSITY OF TECHNOLOGY, Tianjin (CN)

( * ) Notice: Subject to any disclaimer, the term of this patent is extended or adjusted under 35 U.S.C. 154(b) by 444 days.

(21) Appl. No.: 16/641,254

(22) PCT Filed: Jan. 1, 2019

(86) PCT No.: PCT/CN2019/070004
§ 371 (c)(1),
(2) Date: Feb. 24, 2020

(87) PCT Pub. No.: WO2020/073543
PCT Pub. Date: Apr. 16, 2020

(65) Prior Publication Data
US 2020/0372158 A1 Nov. 26, 2020

(30) Foreign Application Priority Data
Oct. 12, 2018 (CN) .......................... 201811188132.6

(51) Int. Cl.
*G06F 21/57* (2013.01)
*G06F 16/27* (2019.01)
(Continued)

(52) U.S. Cl.
CPC .............. *G06F 21/572* (2013.01); *G06F 8/65* (2013.01); *G06F 8/71* (2013.01); *G06F 16/215* (2019.01);
(Continued)

(58) Field of Classification Search
CPC ........ G06F 21/572; G06F 21/12; G06F 21/44; G06F 21/64; G06F 8/65; G06F 8/71;
(Continued)

(56) References Cited

U.S. PATENT DOCUMENTS

| 2018/0068091 | A1 | 3/2018 | Gaidar et al. |
| 2019/0384593 | A1* | 12/2019 | Michiyama ............. G06F 21/64 |
| 2019/0392118 | A1* | 12/2019 | Elden ..................... G06F 21/64 |

FOREIGN PATENT DOCUMENTS

| CN | 107135209 | 9/2017 |
| CN | 108055138 | 5/2018 |
| CN | 108628245 | 10/2018 |

OTHER PUBLICATIONS

"International Search Report (Form PCT/ISA/210) of PCT/CN2019/070004," dated Jul. 10, 2019, pp. 1-5.

* cited by examiner

*Primary Examiner* — Philip J Chea
*Assistant Examiner* — Sangseok Park
(74) *Attorney, Agent, or Firm* — JCIP Global Inc.

(57) ABSTRACT

The invention relates to the field of software management and is intended to invent a blockchain-based software version data management system and an establishing method thereof. The system mainly comprises a data acquisition module, a data transmission module and a data consensus module, wherein the data acquisition module involves data generation, data splicing, and data encapsulation, and provides functions such as acquisition of software version data and structural processing function; the data transmission module involves data communication, data parsing and data forwarding and provides a transmission function for the software version data; the data consensus module involves block synchronization, data verification and consensus mechanism and provides reliability test for the software (Continued)

version data, system new block generation and node data synchronization. Through the decentralized characteristic of the blockchain, the invention avoids the system paralysis problem caused by the single-point fault of the centralized system, solves the problem that the compatibility of the multi-version software systems is not consistent, and reduces the maintenance cost of the software version data.

5 Claims, 5 Drawing Sheets

(51) Int. Cl.
*G06F 16/215* (2019.01)
*G06F 8/65* (2018.01)
*G06F 8/71* (2018.01)
*G06F 21/12* (2013.01)
*G06F 21/44* (2013.01)
*G06F 21/64* (2013.01)

(52) U.S. Cl.
CPC ............ *G06F 16/27* (2019.01); *G06F 21/12* (2013.01); *G06F 21/44* (2013.01); *G06F 21/64* (2013.01); *G06F 2221/033* (2013.01)

(58) Field of Classification Search
CPC .......... G06F 8/60; G06F 16/215; G06F 16/27; G06F 16/273; G06F 2221/033
See application file for complete search history.

BLOCKCHAIN-BASED SOFTWARE VERSION DATA MANAGEMENT SYSTEM AND ESTABLISHING METHOD THEREOF

CROSS-REFERENCE TO RELATED APPLICATION

This application is a 371 of international application of PCT application serial no. PCT/CN2019/070004, filed on Jan. 1, 2019, which claims the priority benefit of China application no. 201811188132.6, filed on Oct. 12, 2018. The entirety of each of the above mentioned patent applications is hereby incorporated by reference herein and made a part of this specification.

TECHNICAL FIELD

The present invention belongs to the technical field of software management, and particularly relates to a blockchain-based software version data management system and an establishing method thereof.

BACKGROUND

With the development of software technology, the number of software has increased year by year. While the software is compatible with a new system, it will also selectively discard the old system, which has caused the uncertainty of the available software versions of the system. There are many existing software platforms, but the software versions of each platform are not consistent, and the software of many software platforms contains a large amount of spam information, causing software infringement. How to ensure software system compatibility information so that users can select software versions based on their own hardware information and how to ensure that software copyrights are not infringed upon are two of the most important issues in software version management.

The current version management methods include the following:

Traditional software version management solution: At present, the method adopted by most software platforms is to display software data based on data released by software companies.

Centralized software version management solution: in a centralized software version management solution, each software company releases its own software data in an official platform maintained by itself. Intercompany software compatibility issues are not considered.

However, the software data released by the existing centralized software version management solution is only up to the system hardware version when the software is released. The system or hardware released after the software is released is not effectively tested, and the existing software version management solution cannot support collaborative software development based on company needs.

In addition, most of the existing traditional software version management solutions have not verified the credibility of the data, and have not effectively detected the source of the software and whether or not it contains spam or malicious content, resulting in a large amount of unavailable software flooding the entire software platform.

Therefore, in view of the unclear software operating environment, the problem of inconsistent compatibility of multi-version software systems is resolved, and based on the fact that the blockchain information cannot be tampered with, a blockchain-based decentralized software version data management system and an establishing method thereof are designed; by means of the blockchain and P2P, the software copyright issue is solved, to ensure that the software obtained by users is genuine software released by its vendor, and to achieve common maintenance and management of software versions and collaborative software development.

SUMMARY OF THE INVENTION

The objective of the present invention is to overcome the shortcomings of the prior art, and to provide a blockchain based software version data management system that can ensure that the software obtained by users is genuine software released by vendors and solve the problem of inconsistent compatibility of multi-version software systems and an establishing method thereof.

The present invention solves the technical problem by adopting the following technical solutions:

A blockchain-based software version data management system, comprising a data acquisition module, a data transmission module and a data consensus module, wherein the data acquisition module is configured to acquire data information and structure the data information to make preparations for data broadcasting; the data transmission module is configured to transmit and verify software version data in the blockchain; the data consensus module is configured to enable software version management parties to reach a consensus on the software version through a consensus mechanism and to provide a software address interface so that users obtain related software;

the data acquisition module involves data generation, data splicing and data encapsulation, wherein the data generation is implemented by collecting respective software data by all parties involved in the software version management and forming standard data by the vendors; and the data splicing and data encapsulation are for screening, integrating and labeling the collected data, removing duplicate data and data that does not meet requirements, giving unified storage standards for synthetic data, and splicing, storing, and encapsulating the screened data to form structured data;

the data transmission module involves data communication, data parsing and data forwarding, wherein data communication and data forwarding are for addressing the general participation of all parties involved in software version management and providing the parties involved in software version management with decentralized P2P network communication by conducting negotiations among the parties and signing the alliance treaty and based on the blockchain communication protocol, and data parsing is for parsing the transmitted data by rules, and the data that cannot be parsed will be discarded or retransmitted;

the data consensus module involves block synchronization, data verification and a consensus mechanism, wherein the block synchronization is for receiving and synchronizing block data by setting sockets, the data verification is for ensuring the reliability of software sources and software data in synchronized blocks and processing tampered software; and the consensus mechanism refers to a consensus mechanism of the blockchain for protecting and releasing the software download record, tracing the source of the download record, and storing the download record in a topological manner.

An establishing method of a blockchain-based software version data management system, comprising the following steps:

(1) Data Generation and Processing

All parties involved in version management collect their own data, clean the data, remove duplicate and useless data, and perform data verification on the processed data to ensure the correctness of the data, and then use software to generate character strings representing software and its addresses, as well as block software addresses, and the MD5 check codes and SHA1 check codes of software, and structure and encapsulate software data and software addresses to generate software version information.

(2) Data Communication

Node initialization configuration is performed for all parties involved in software version management, nodes are organized into a regional autonomous alliance through the signing of an alliance treaty among all the parties, a unique ID is configured for each alliance node, and initial network state parameters are added to the stored IDs, the state parameters include the number of nodes and the state of each node, and the stored IDs are structured to generate new storage data as genesis blocks broadcast to the entire network; each node in the entire network stores the genesis block data and adopts a blockchain based communication protocol.

(3) Data Consensus

The nodes on the chain releases the software version information generated in step (1); other nodes receive the information via broadcast and use digital signature technology to determine the authenticity of the identity of a node broadcasting information and the data; if the node broadcasting information is a member node of the alliance, the integrity of the software version information is verified, and if the verification is successful, the software data is placed on the chain; if the node is a non-chain member, all the nodes in the blockchain network reach a consensus on the license through a consensus mechanism, and if the license is obtained from more than half of the nodes in the alliance, the information passes the verification, the node information is added to the genesis block, and the integrity of the software version information is verified, and if the verification is successful, the software information is placed on the chain; if the license is not obtained from more than half of the nodes in the alliance or the information verification fails, then the information should be rejected.

It should be noted that, in step (2), when a new node applies to joining the network, it must be broadcast to the entire network, and through the negotiation and determination of all members in the chain, the initial information parameters of the node are generated into new data that is stored in the genesis block.

In addition, the content of the communication protocol in the communication protocol configuration process in the step (2) is: a user broadcasts the software information to the entire network, and other users of the system store and forward the information after receiving the broadcast information; all secondary nodes in the system elect a primary node to generate a new block and broadcast the new block; each secondary node in the system verifies the validity of the broadcast block; if the verification is successful, the node's own blockchain is updated, and if the verification fails, a new primary node is elected to perform block generation.

Moreover, in addition to the space occupation caused by software sharing, software integrity verification is also one of the main issues in software sharing. In order to effectively ensure the integrity of the software, the process of verifying the integrity of the software version data in step (3) is as follows: after receiving the broadcast software version information, the alliance nodes request the software based on the address and determines the authenticity of the software verification. If the software verification is successful, the software version information is generated into a block to be broadcast to the entire network; when downloading complete software, a user needs to perform check code computing on the downloaded software and compare the computed check code with the check code stored in the blockchain. If the verification is successful, a new software address is generated and broadcast to the entire network, the node with a right to package the block verifies the new address, and if the address is valid, then the address is placed in the block, so that other software acquirers can obtain the software from the block; if the verification fails, then the software vendor is notified to perform data cleaning and encapsulation on the software version information again.

The advantages and positive effects of the present invention are as follows:

1. The present invention ensures true and reliable data in the form of sharing the record in the entire network on the basis of the blockchain while realizing sharing among the member nodes; therefore, the problem of widespread spread of junk software and pirated software is effectively solved.

2. The decentralized strategy of the blockchain of the present invention can reduce the maintenance cost of the platform and reduce the management difficulty of a single software company.

3. The distributed block architecture of the present invention ensures that the system will not be paralyzed due to a single-point failure and effectively avoids the impact of DDOS attacks on the system.

4. In the present invention, only authorized nodes can release data. After being processed, the data is placed on the blockchain, which effectively guarantees the reliability and authenticity of the information. Through the digital signature mechanism, both the authenticity and security of the data can be ensured.

BRIEF DESCRIPTION OF THE DRAWINGS

The technical solutions of the present invention will be further described in detail below with reference to the accompanying drawings and embodiments, but it should be understood that these drawings are designed for the purpose of explanation only, and thus are not intended to limit the scope of the present invention. In addition, the drawings are only intended to conceptually illustrate the structural constructions described herein unless specified otherwise, and are not necessarily drawn in scale.

DETAILED DESCRIPTION

First of all, it should be noted that the specific structures, features, advantages and the like of the present invention will be described below in detail by way of example. However, all the descriptions are for the illustrative purpose only and should not be construed as limiting the present invention in any way. In addition, any single technical feature described or implied in the various embodiments referred to herein may still be, among these technical features (or equivalents thereof), combined or deleted in any way to obtain more other embodiments of the present invention that may not be directly mentioned herein.

It should be noted that the terms used herein are only for describing specific embodiments and are not intended to limit the exemplary embodiments according to the present application. As used herein, the singular forms are intended to include the plural forms as well, unless the context clearly indicates otherwise. In addition, the terms "comprising" and "having" and any of their variations are intended to cover non-exclusive inclusions, for example, processes, methods, systems, products, or devices including a series of steps or units does not need to be limited to those steps or units that are explicitly listed, but may include other steps or units that are not explicitly listed or that are inherent to these processes, methods, products, or devices.

It should be noted that embodiments in the present application and the features in the embodiments may be combined with each other without conflict.

The present invention will be specifically described below in conjunction with FIG. 1 to FIG. 6.

Embodiment 1

Figure 1:
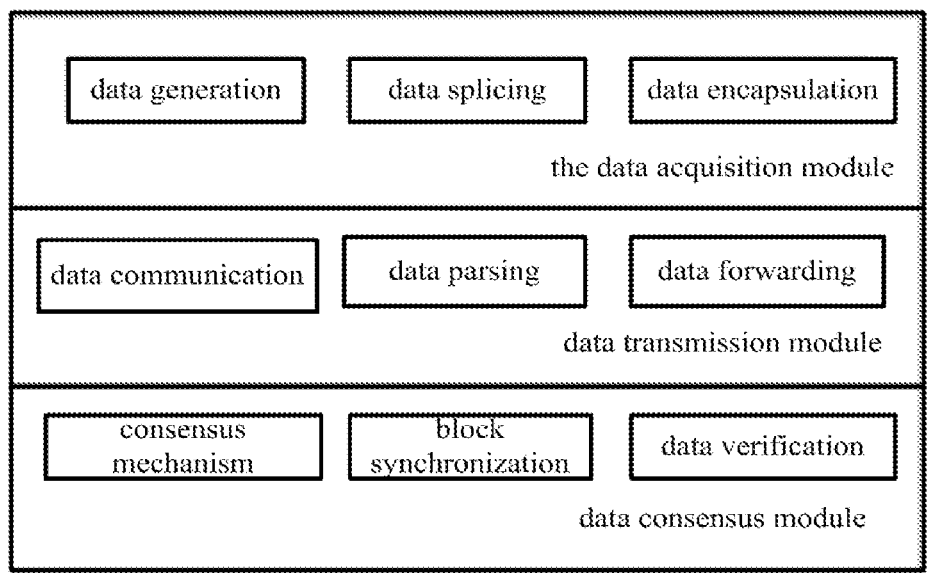
FIG. 1 is a schematic structural diagram of a blockchain based software version data management system according to an embodiment of the present invention.
Figure 2:
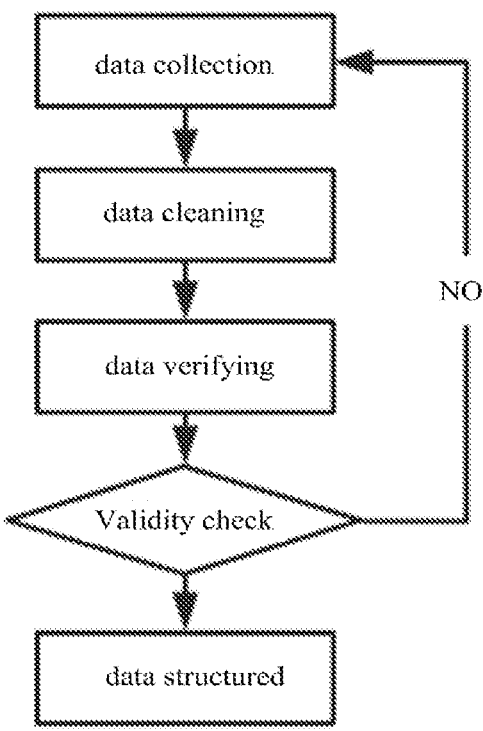
FIG. 2 is a flowchart of data processing in the establishment process of the blockchain based software version data management system according to an embodiment of the present invention.
Figure 3:
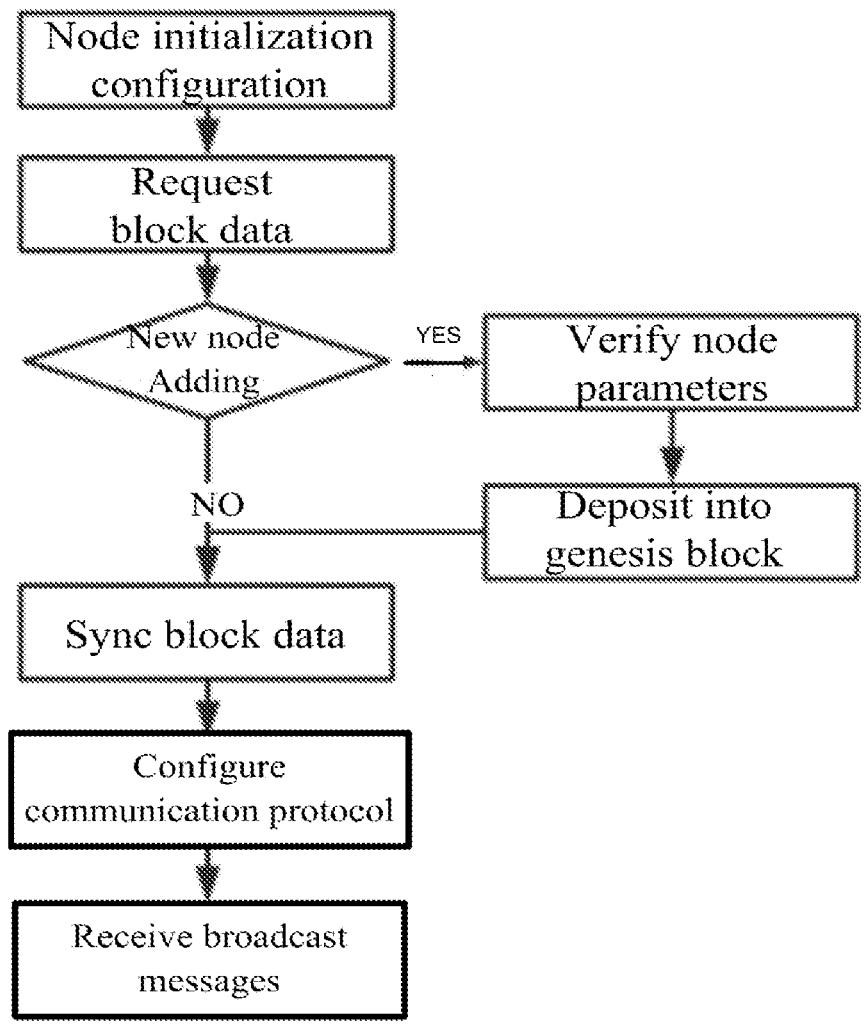
FIG. 3 is a flowchart of data communication in the establishment process of the blockchain based software version data management system according to an embodiment of the present invention.
Figure 4:
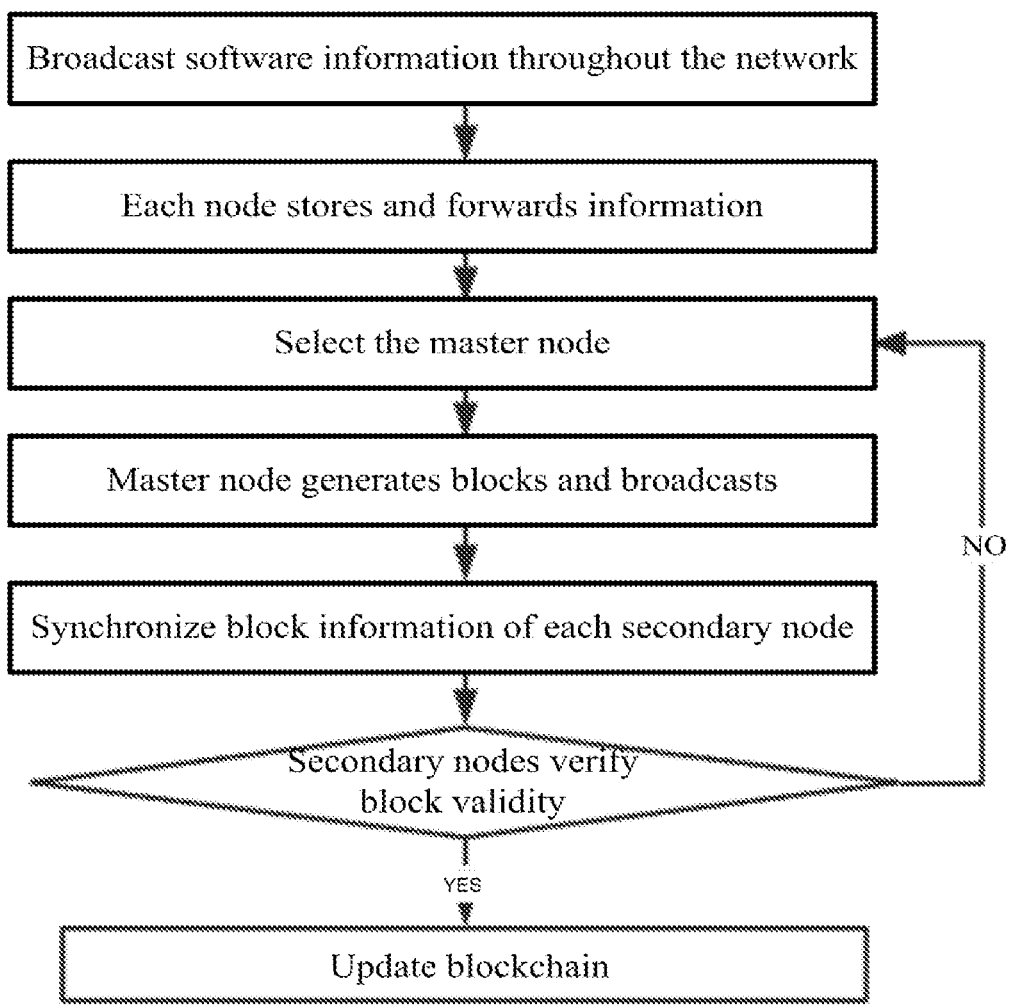
FIG. 4 is a flowchart of communication protocol content in the establishment process of the blockchain based software version data management system according to an embodiment of the present invention.
Figure 5:
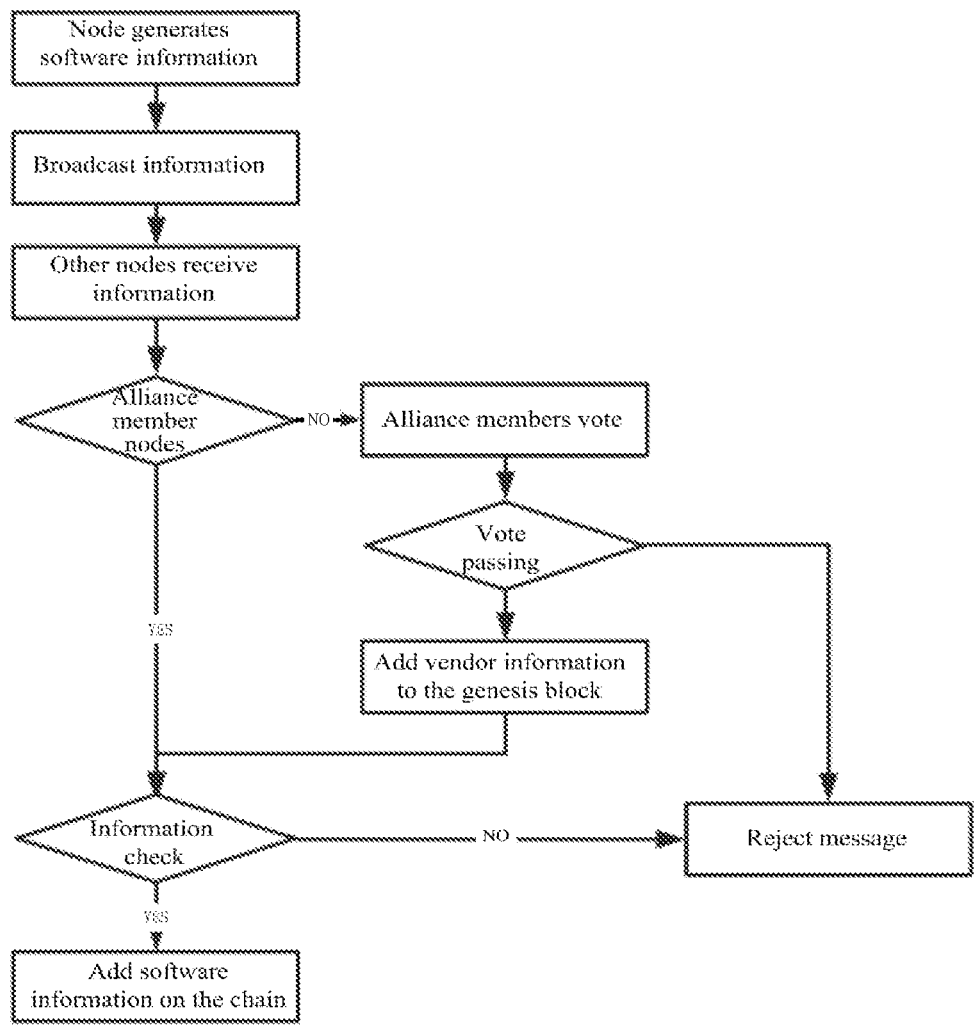
FIG. 5 is a flowchart of data consensus in the establishment process of the blockchain based software version data management system according to an embodiment of the present invention.
Figure 6:
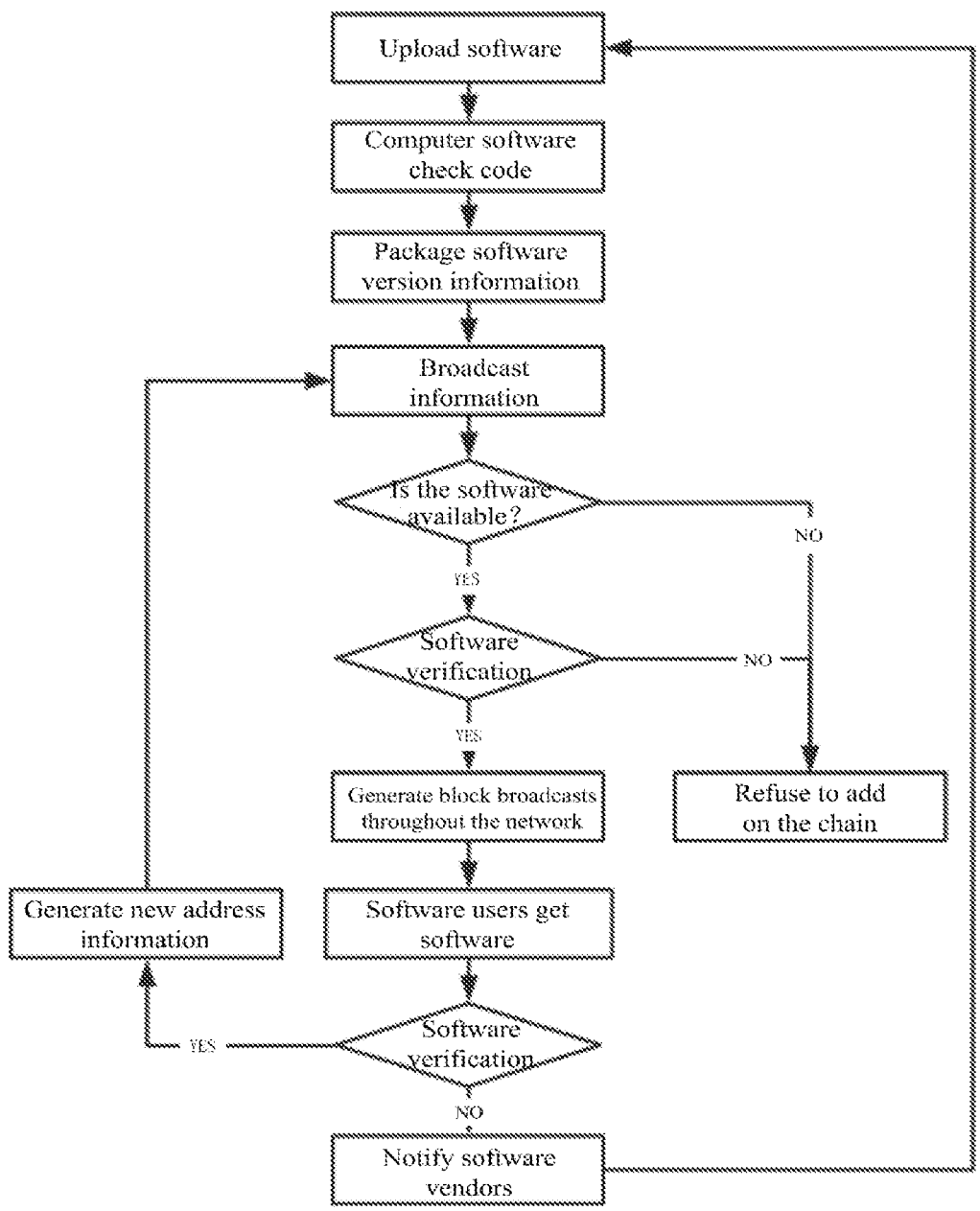
FIG. 6 is a flowchart of software address consensus in the establishment process of the blockchain based software version data management system according to an embodiment of the present invention.

FIG. 1 is a schematic structural diagram of a blockchain based software version data management system according to an embodiment of the present invention; FIG. 2 is a flowchart of data processing in the establishment process of the blockchain based software version data management system according to an embodiment of the present invention; FIG. 3 is a flowchart of data communication in the establishment process of the blockchain based software version data management system according to an embodiment of the present invention; FIG. 4 is a flowchart of communication protocol content in the establishment process of the blockchain based software version data management system according to an embodiment of the present invention; FIG. 5 is a flowchart of data consensus in the establishment process of the blockchain based software version data management system according to an embodiment of the present invention; and FIG. 6 is a flowchart of software address consensus in the establishment process of the blockchain based software version data management system according to an embodiment of the present invention. As shown in FIG. 1 to FIG. 6, a blockchain-based software version data management system provided by this embodiment comprises a data acquisition module, a data transmission module and a data consensus module, wherein the data acquisition module is configured to acquire data information and structure the data information to make preparation for data broadcasting; the data transmission module is configured to transmit and verify software version management data in the blockchain; the data consensus module is configured to enable software version management parties to reach a consensus on the software version through a consensus mechanism and to provide a software address interface so that users obtain related software;

the data acquisition module involves data generation, data splicing, and data encapsulation, wherein the data generation is implemented by collecting respective software data by all parties involved in the software version management and forming standard data by the vendors; and the data splicing and data encapsulation are for screening, integrating and labeling the collected data, removing duplicate data and data that does not meet requirements, giving unified storage standards for synthetic data, and splicing, storing, and encapsulating the screened data to form structured data;

the data transmission module involves data communication, data parsing, and data forwarding, wherein data communication and data forwarding are for addressing the general participation of all parties involved in software version management and providing the parties involved in software version management with decentralized P2P network communication by conducting negotiations among the parties and signing the alliance treaty and based on the blockchain communication protocol, and data parsing is for parsing the transmitted data by rules, and the data that cannot be parsed will be discarded or retransmitted;

the data consensus module involves block synchronization, data verification, and a consensus mechanism. The block synchronization is for receiving and synchronizing block data by setting sockets. The data verification is for ensuring the reliability of software sources and software information in synchronized blocks and processing tampered software; and the consensus mechanism refers to a consensus mechanism of the blockchain for protecting and releasing the software download record, tracing the source of the download record, and storing the download record in a topological manner.

An establishing method of a blockchain-based software version data management system, comprising the following steps:

(1) Data Generation and Processing

As shown in FIG. 2, all parties involved in version management collect their own data, clean the data, remove duplicate and useless data, and perform data verification on the processed data to ensure the correctness of the data, wherein the data verification here uses the data verification methods in the prior art to verify whether or not there is any error or other errors in the data information and to ensure the correctness of the data; and then software is used to generate character strings representing software and its addresses, as well as block software addresses, and the MD5 check codes and SHA1 check codes of the software; software data and software addresses are structured and encapsulated to generate software version information.

(2) Data Communication

As shown in FIG. 3, Node initialization configuration is performed for all parties involved in software version management, nodes are organized into a regional autonomous alliance through the signing of an alliance treaty among all the parties, a unique ID is configured for each alliance node, and initial network state parameters are added to the stored IDs, the state parameters include the number of nodes and the state of each node, and the stored IDs are structured to generate new storage data as genesis blocks; the genesis blocks are broadcast to the entire network via a blockchain based communication protocol; each node in the entire network stores the genesis block data; when a new node applies to joining the network, a message broadcast requesting block data must be transmitted to the entire network, and the correctness of the node parameters in the broadcast request are negotiated and determined by all members in the chain; after the negotiation and determination are successful, the initial information parameters of the node are generated into new information that is stored in the genesis block; the blockchain data is then transmitted to the node to configure the communication protocol of the blockchain on the node; up to this point, the node successfully completes its initial system configuration, and began to accept broadcast information and work with other nodes to process broadcast requests for the blockchain.

It should be noted that the content of the communication protocol in the communication protocol configuration process in the step (2) is as shown in FIG. 4: a user of the blockchain-based software version data management system broadcasts software data to the entire network, and other users of the system store and forward the information after receiving the broadcast information; all secondary nodes in the system elect a primary node to generate a new block and broadcast the new block; each secondary node in the system verifies the validity of the broadcast block; if the verification is successful, the node's own blockchain is updated, and if the verification fails, a new primary node is elected to perform block generation.

(3) Data Consensus

As shown in FIG. 5, The nodes on the chain releases the software version information generated in step (1); other nodes receive the information via broadcast and use digital signature technology to determine the authenticity of the identity of a node broadcasting information and the information; if the node broadcasting information is a member node of the alliance, the integrity of the software version data is verified, and if the verification is successful, the software data is placed on the chain; if the node is a non-chain member, all the nodes in the blockchain network reach a consensus on the license through a consensus mechanism, and if the license is obtained from more than half of the nodes in the alliance, the data passes the verification, the node information is added to the genesis block, and the integrity of the software version data is verified, and if the verification is successful, the software information is placed on the chain; if the license is not obtained from more than half of the nodes in the alliance or the information verification fails, then the information should be rejected.

It should be noted that the process of verifying the integrity of the software version data in step (3) is as shown in FIG. 6: a software vendor uses software to generate character strings representing software and its addresses, block software addresses, MD5 check codes and SHA1 check codes of software, structures and encapsulates software information and software addresses to generate software version information, and broadcasts the software version information to the entire network; after receiving the broadcast software version information, the alliance nodes requests the software based on the address, and determine the authenticity of the software verification. If the software verification is successful, the software version data is generated into a block to be broadcast to the entire network; when downloading complete software, a user need to perform check code computing on the downloaded software and compare the computed check code with the check code stored in the blockchain. If the verification is successful, a new software address is generated and broadcast to the entire network, the node with a right to package the block verifies the new address, and if the address is valid, then the address is placed in the block, so that other software acquirers can obtain the software from the block; if the verification fails, then the software vendor is notified to perform data cleaning and encapsulation on the software version data again.

In summary, the present invention is intended to provide a blockchain based software version data management system that can ensure that the software obtained by users is genuine software released by vendors and solve the problem of inconsistent compatibility of multi-version software systems, and an establishing method thereof.

The present invention is described in detail in the above embodiment; however, what disclosed above is only a preferred embodiment of the present invention, not considered as limiting the scope of the present invention. All equivalent changes and improvements made in accordance with the scope of application of the present invention should still fall within the scope of the patent of the present invention.

What is claimed is:

1. A blockchain-based software version data management system, said system comprising a data acquisition module, a data transmission module and a data consensus module, wherein the data acquisition module is configured to acquire data information and structure the data information to make preparations for data broadcasting; the data transmission module is configured to transmit and verify software version data in the blockchain; the data consensus module is configured to enable software version management parties to reach a consensus on the software version through a consensus mechanism and to provide a software address interface so that users obtain related software;

the data acquisition module involves data generation, data splicing and data encapsulation, wherein the data generation is implemented by collecting respective software data by all parties involved in the software version management and forming standard data by vendors; and the data splicing and the data encapsulation are for screening, integrating and labeling the collected data, removing duplicate data and data that does not meet requirements, giving unified storage standards for synthetic data, and splicing, storing, and encapsulating the screened data to form structured data;

the data transmission module involves data communication, data parsing and data forwarding, wherein the data communication and the data forwarding are for addressing the general participation of all parties involved in the software version management and providing the parties involved in the software version management with decentralized P2P network communication by conducting negotiations among the parties and signing the alliance treaty and based on a blockchain communication protocol, and the data parsing is for parsing the transmitted data by rules, and the data that cannot be parsed will be discarded or retransmitted;

the data consensus module involves block synchronization, data verification and a consensus mechanism, wherein the block synchronization is for receiving and synchronizing block data by setting sockets, the data verification is for ensuring the reliability of software sources and software data in synchronized blocks and processing tampered software; and the consensus mechanism refers to a consensus mechanism of the blockchain for protecting and releasing a software download record, tracing the source of a download record, and storing the download record in a topological manner.

2. An establishing method of a blockchain-based software version data management system, said method comprising the following steps:

(1) Data generation and processing

All parties involved in version management collect their own data, clean the data, remove duplicate and useless data, and perform data verification on the processed data to ensure the correctness of the data, and then use software to generate character strings representing software and its addresses, as well as block software addresses, and MD5 check codes and SHA1 check codes of software, and structure and encapsulate software data and software addresses to generate software version information;

(2) Data communication

Node initialization configuration is performed for all parties involved in software version management, nodes are organized into a regional autonomous alliance through the signing of an alliance treaty among all the parties, a unique ID is configured for each alliance node, and initial network state parameters are added to the stored IDs, the state parameters include the number of nodes and the state of each node, and the stored IDs are structured to generate new storage data as genesis blocks broadcast to the entire network; each node in the entire network stores the genesis block data and adopts a blockchain based communication protocol;

(3) Data consensus

The nodes on the chain releases the software version information generated in step (1); other nodes receive the information via broadcast and use digital signature technology to determine the authenticity of the identity of a node broadcasting information and the data; if the node broadcasting information is a member node of the alliance, the integrity of the software version information is verified, and if the verification is successful, the software data is placed on the chain; if the node is a non-chain member, all the nodes in the blockchain network reach a consensus on a license through a consensus mechanism, and if the license is obtained from more than half of the nodes in the alliance, the information passes the verification, the node information is added to the genesis block, and the integrity of the software version information is verified, and if the verification is successful, the software information is placed on the chain; if the license is not obtained from more than half of the nodes in the alliance or the information verification fails, then the information should be rejected.

3. The method according to claim 2, in step (2), when a new node applies to joining the network, it must be broadcast to the entire network, and through the negotiation and determination of all members in the chain, initial information parameters of the node are generated into new data that is stored in the genesis block.

4. The method according to claim 2, in step (2), the content of the communication protocol in the communication protocol configuration process is: a user broadcasts the software information to the entire network, and other users of the system store and forward the information after receiving the broadcast information; all secondary nodes in the system elect a primary node to generate a new block and broadcast the new block; each secondary node in the system verifies the validity of the broadcast block; if the verification is successful, the node's own blockchain is updated, and if the verification fails, a new primary node is elected to perform block generation.

5. The method according to claim 2, in step (3), the process of verifying the integrity of the software version data is as follows: after receiving the broadcast software version information, the alliance nodes requests the software based on the address and determines the authenticity of the software verification; if the software verification is successful, the software version information is generated into a block to be broadcast to the entire network; when downloading complete software, a user needs to perform check code computing on the downloaded software and compare the computed check code with the check code stored in the blockchain; if the verification is successful, a new software address is generated and broadcast to the entire network, the node with a right to package the block verifies the new address, and if the address is valid, then the address is placed in the block, so that other software acquirers can obtain the software from the block; if the verification fails, then the software vendor is notified to perform data cleaning and encapsulation on the software version information again.

* * * * *